(12) United States Patent
Laible (10) Patent No.: US 8,726,939 B2
(45) Date of Patent: May 20, 2014

(54) HAND-HELD DISPENSER

(75) Inventor: Rodney Laible, Omaha, NE (US)

(73) Assignee: RL Innovations, LLC, Omaha, NE (US)

( * ) Notice: Subject to any disclaimer, the term of this patent is extended or adjusted under 35 U.S.C. 154(b) by 158 days.

(21) Appl. No.: 13/465,125

(22) Filed: May 7, 2012

(65) Prior Publication Data

US 2013/0291955 A1    Nov. 7, 2013

(51) Int. Cl.
*B01F 5/04* (2006.01)
*B05B 7/26* (2006.01)
*B05B 7/30* (2006.01)

(52) U.S. Cl.
USPC .............................. 137/892; 239/310; 239/318

(58) Field of Classification Search
CPC .......... B05B 7/2443; B05B 7/26; B05B 7/12; B05B 7/04; B05B 7/0408; B05B 7/1209; F16K 27/0263; F16K 11/08; F16K 11/20; F16K 11/14; F16K 11/18; F16K 11/22; F16K 31/58

USPC ........... 239/10, 315, 407, 413, 414, 417, 316, 239/318, 310, 583; 137/888, 892, 893
See application file for complete search history.

(56) References Cited

U.S. PATENT DOCUMENTS

| 2,388,445 | A | 9/1942 | Stewart |
| 7,237,728 | B1 | 7/2007 | Laible |
| 7,296,761 | B1 | 11/2007 | Laible |
| 8,069,878 | B2 | 12/2011 | Laible |
| 2012/0234935 | A1* | 9/2012 | Sun ................................ 239/10 |

* cited by examiner

*Primary Examiner* — Elizabeth Houston
*Assistant Examiner* — Michael R Reid
(74) *Attorney, Agent, or Firm* — Dennis L. Thomte; Thomte Patent Law Office LLC (57) ABSTRACT

A hand-held dispenser for precisely controlling the flow rate of water therethrough and for injecting a liquid chemical into the water passing through the dispenser. The dispenser includes a slide valve for changing the flow rate of the liquid chemical water therethrough. The slide valve may also be positioned so that only rinse water is discharged from the dispenser.

6 Claims, 12 Drawing Sheets

HAND-HELD DISPENSER

BACKGROUND OF THE INVENTION

1. Field of the Invention

This invention relates to a hand-held dispenser and more particularly to a hand-held dispenser which is convenient to use and which is capable of controlling the flow rate of water therethrough for mixing with a liquid chemical into the water passing through the dispenser.

2. Description of the Related Art

Many types of dispensers have been previously provided which may be connected to the end of a water hose or the like wherein a device introduces chemicals into the water flow so that a lawn or the like may be sprayed. The devices of the prior art are also able to inject liquid chemicals into a water stream so that a mop bucket, bottle, may be filled with water, detergent or other chemicals.

In Applicant's earlier U.S. Pat. Nos. 7,237,728; 7,296,761, and 8,069,878, hand-held dispensers are disclosed which are able to conveniently and economically precisely control the rate of water flow through the dispenser and to precisely control the metering of liquid chemicals in the precisely controlled flow of water.

Although the dispensers of Applicant's earlier patents have met with considerable success, Applicant has developed an improved hand-held dispenser which is convenient to use and which precisely controls the water flow therethrough and the injection of liquid chemicals thereinto.

SUMMARY OF THE INVENTION

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

A hand-held dispenser is described for precisely and conveniently controlling the flow rate of water therethrough and for controlling the flow rate of the liquid chemical or the like therethrough to be mixed with the water passing therethrough.

The dispenser of this invention includes a body member having a generally horizontally disposed first body portion having first and second sides, an inlet end, and a discharge end. The body member also includes a generally vertically disposed second body portion extending downwardly from the first body portion. The second body portion has a lower end which is adapted to be secured to a liquid container. The first body portion has a generally horizontally disposed first body member which extends inwardly from the inlet end of the body member towards the discharge end thereof. The first body member has an inlet end and a discharge end. The first body member has a horizontally disposed first passageway formed therein which extends from the inlet end towards the discharge end thereof. The first passageway has an inlet end and a discharge end. The inlet end of the first fluid passageway is adapted to be placed in communication with a source of water under pressure.

The first body portion also has a generally vertically disposed second body member positioned at the discharge end of the first body member with the second body member having upper and lower ends. The second body member has a cylindrical chamber formed therein which has an inlet end and a discharge end. The second body member also has a horizontally disposed annular valve seat molded therein above its inlet end. The valve seat has a lower inlet side and an upper discharge side. The lower inlet side of the valve seat is in communication with the first passageway. The upper discharge side of the valve seat is in communication with the chamber.

A first valve means is selectively vertically movably mounted in the chamber. The first valve means includes a valve member with a valve stem secured to the valve member which extends upwardly therefrom through the valve seat and the chamber. The first valve means is selectively vertically movable between a lower position and an upper position. The valve member of the first valve means closes the valve seat when the first valve means is in its upper position. The valve member, when the first valve means is in its lower position, permits the flow of water from the first passageway, through the valve seat, and upwardly into the chamber.

A valve actuating lever is pivotally secured to the first body portion which is operatively connected to the upper end of the valve stem. The valve actuating lever is pivotally movable from an upper "off" position wherein the first valve means is in its upper position to a lower "on" position wherein the valve member is unseated from the valve seat. The discharge end of the first passageway is positioned below the lower inlet end of the valve seat so that the water under pressure in the first passageway exerts pressure against the lower end of the valve member of the first valve means when the first valve means is in its upper position to assist in maintaining the first valve means in its upper position.

The first body portion has a horizontally disposed second passageway formed therein which extends from the chamber, above the valve seat, towards the discharge end of the first body portion. The first body portion has a transversely extending rectangular housing positioned at the downstream side of the second body member. The rectangular housing includes a bottom wall, a top wall, a back wall, a front wall, a closed first end and an open second end. The bottom wall of the housing has a liquid chemical inlet opening formed therein which is in fluid communication with the liquid container. The back wall of the housing has a water inlet opening formed therein which is in communication with the second passageway of the first body portion. The front wall of the housing has a discharge opening formed therein.

A rectangular slide valve is slidably mounted in the rectangular housing between a first position, an intermediate position, and a second position. The slide valve has a lower end, an upper end, a back side, a front side, a first end and a second end. The first liquid chemical passageway, having upper and lower ends, extends vertically upwardly from the lower end of the slide valve partially through the slide valve. A second liquid chemical passageway, having upper and lower ends, extends vertically upwardly from the lower end of the slide valve partially through the slide valve. A first water passageway, having a back end and a front end, extends horizontally through the slide valve. The first liquid chemical passageway is in fluid communication with the first water passageway. A second water passageway, having a back end and a front end, extends horizontally through the slide valve in a spaced relationship with respect to the first water passageway. The second liquid chemical passageway is in fluid communication with the second water passageway. An intermediate water passageway, having a back end and a front end, extends horizontally through the slide valve between the first and second water passageways.

The slide valve is selectively horizontally slidably movable between first, intermediate and second positions relative to the housing. The back end of the first water passageway of the slide valve is in fluid communication with the water inlet opening in the back wall of the housing when the slide valve is in its first position. The back end of the second water passageway of the slide valve is in fluid communication with a water inlet opening in the back wall of the housing when the slide valve is in the second position. The back end of the intermediate water passageway of the slide valve is in fluid communication with the water inlet opening in the back wall of the housing when the slide valve is in its intermediate position. The front end of the first water passageway of the slide valve is in fluid communication with the discharge opening in the front wall of the housing when the slide valve is in its first position. The front end of the second water passageway of the slide valve is in fluid communication with the discharge opening in the front wall of the housing when the slide valve is in its second position. The front end of the intermediate water passageway of the slide valve is in fluid communication with the discharge opening of the front wall of the housing when the slide valve is in its intermediate position.

A rotatable selector knob is rotatably mounted on the body member about a vertical axis. The selector knob is rotatable between first, intermediate and second positions. The selector knob is operatively connected to the slide valve to selectively move the slide valve between first, intermediate and second positions.

The slide valve has gear teeth formed therein. The selector knob also has gear teeth formed therein which are in meshing engagement with the gear teeth on the slide valve. The rotation of a selector knob causes the slide valve to be slidably moved within the housing. The discharge opening of the housing is in fluid communication with the discharge end of the body member.

The slide valve is selectively removable from the housing so that alternate slide valves may be selectively positioned in the housing.

In the preferred embodiment, the first and second chemical passageways in the slide valve have metering orifices positioned therein. In the preferred embodiment, the first and second water passageways in the slide valve have metering orifices positioned therein.

In the preferred embodiment, the slide valve includes a selectively removable insert positioned therein with the first and second chemical passageway and the first and second intermediate water passageways being formed in the removable insert.

The dispenser also includes a thumb switch which is movable between "on" and "off" positions.

The water flow rate through the dispenser and the chemical flow rate through the dispenser may be controlled by rotating the selector knob.

It is therefore a principal object of the invention to provide an improved hand-held dispenser.

A further object of the invention is to provide an improved chemical dispenser.

Still another object of the invention is to provide an improved hand-held dispenser which dispenses chemicals mixed with water.

Still another object of the invention is to provide a dispenser of the type described which enables the precise control rate of the flow rate of water therethrough and to easily change the control rate of the flow rate.

Yet another object of the invention is to provide a hand-held dispenser which includes a transversely movable slide valve having water passageways and chemical passageways formed therein which enables the water/chemical flow rates to be easily changed.

These and other objects will be obvious to those skilled in the art.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DETAILED DESCRIPTION OF THE INVENTION

Figure 1:
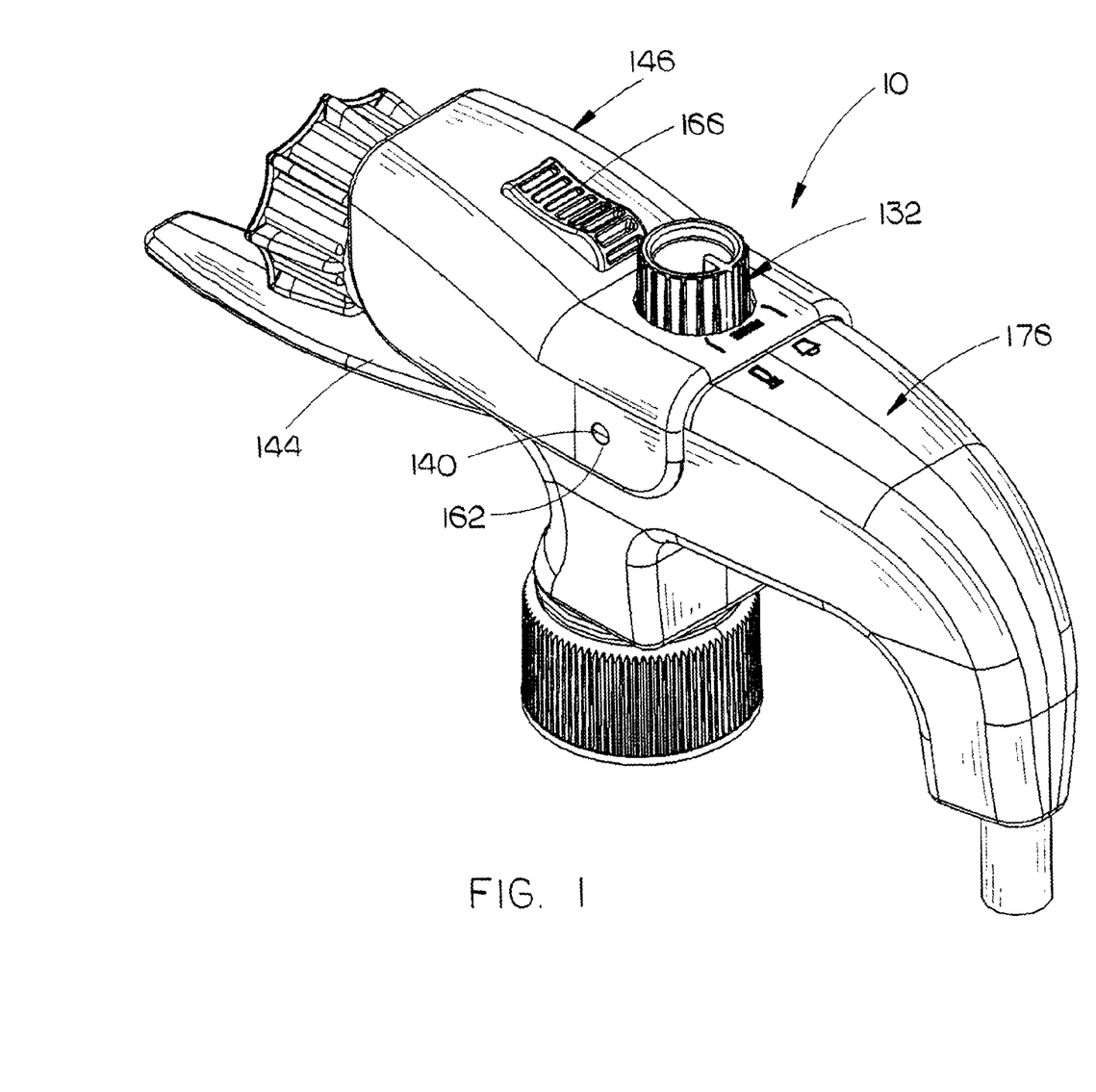
FIG. 1 is a front perspective view of the hand-held dispenser of this invention.
Figure 2:
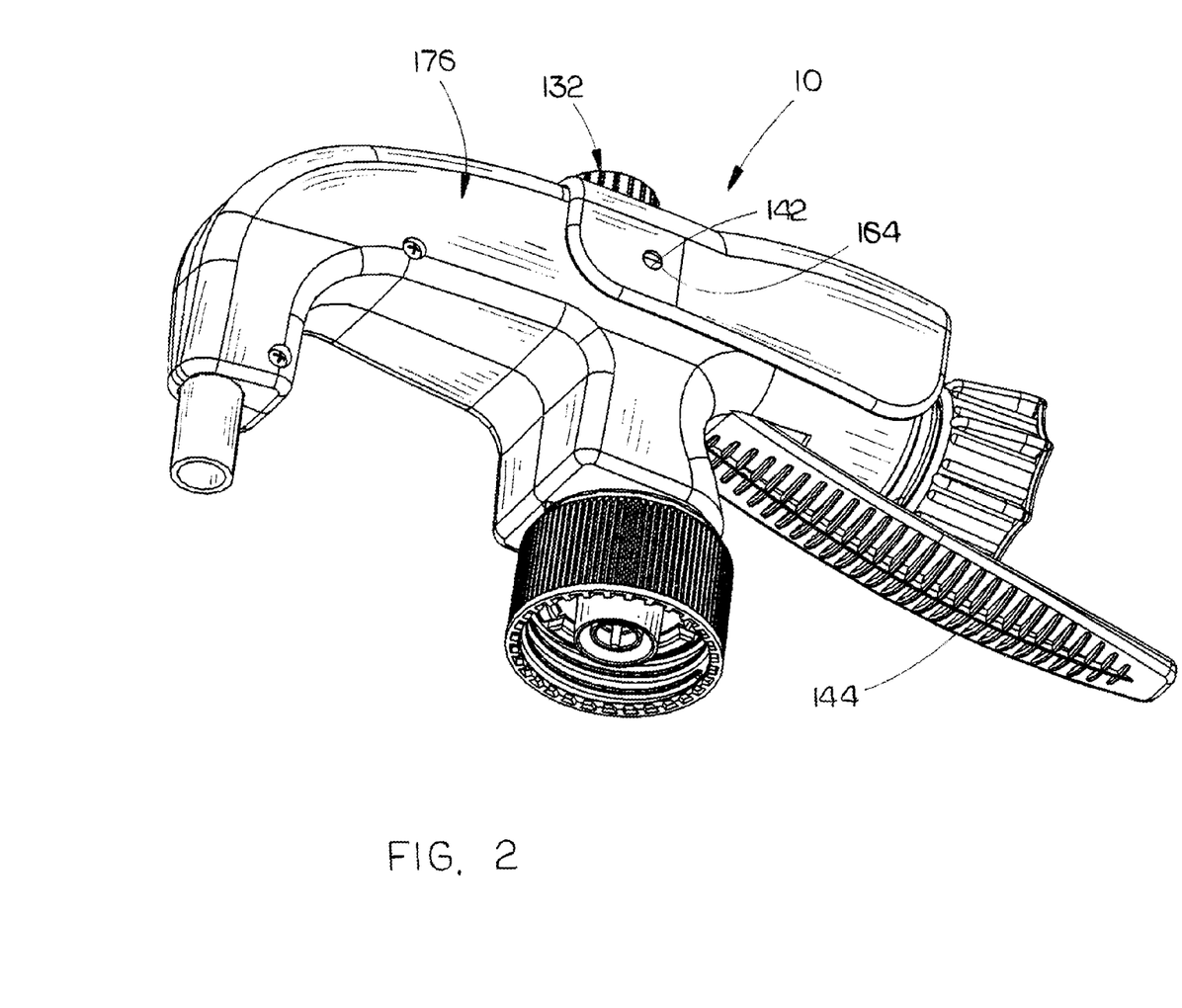
FIG. 2 is a bottom perspective view of the hand-held dispenser of this invention.
Figure 3:
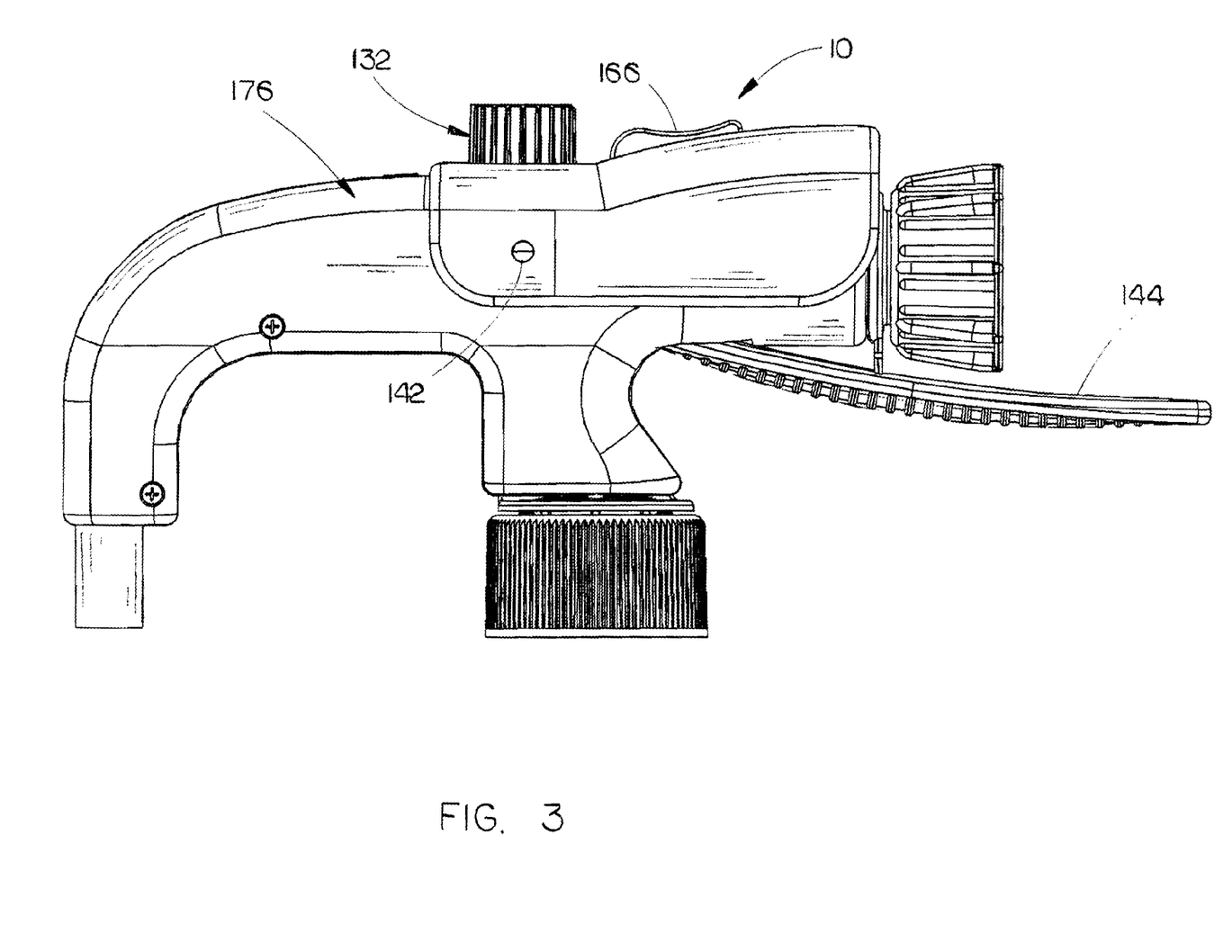
FIG. 3 is a side view of the hand-held dispenser of this invention.
Figure 4:
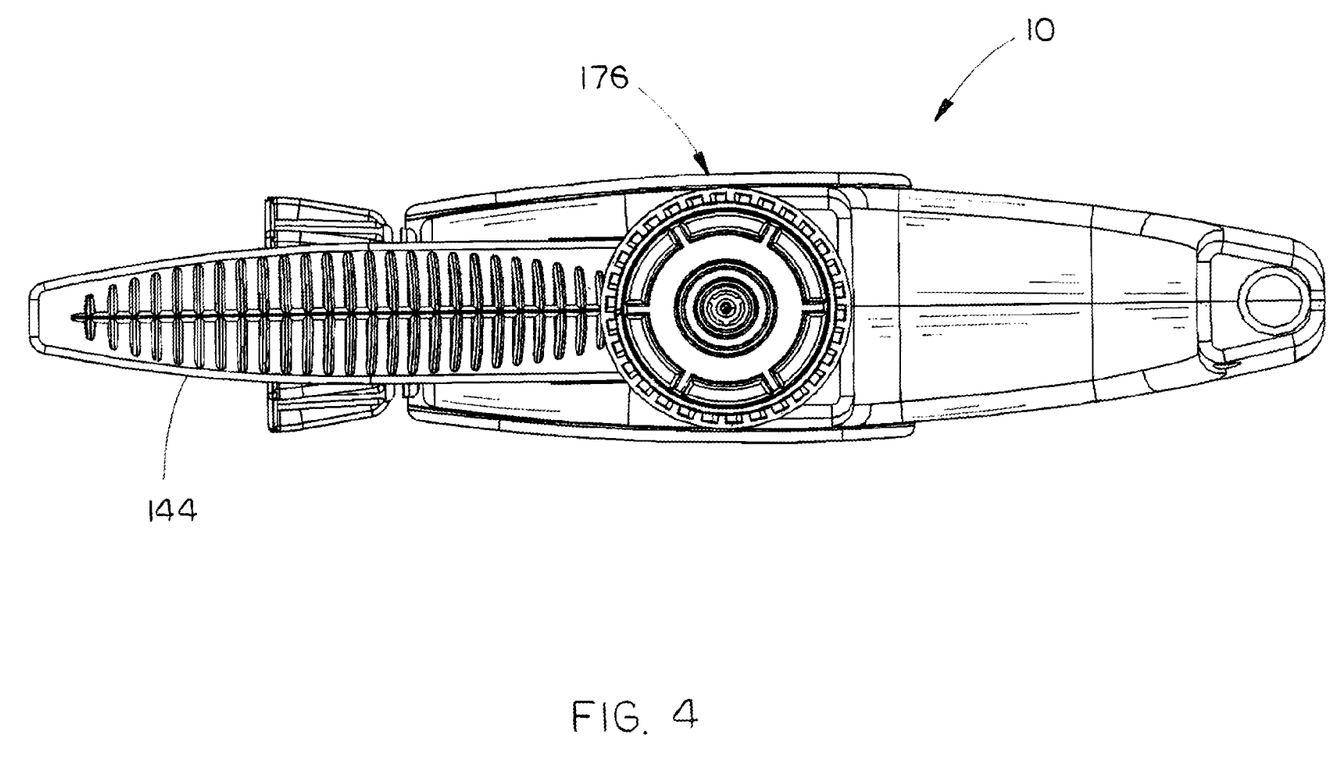
FIG. 4 is a bottom view of the hand-held dispenser of this invention.
Figure 5:
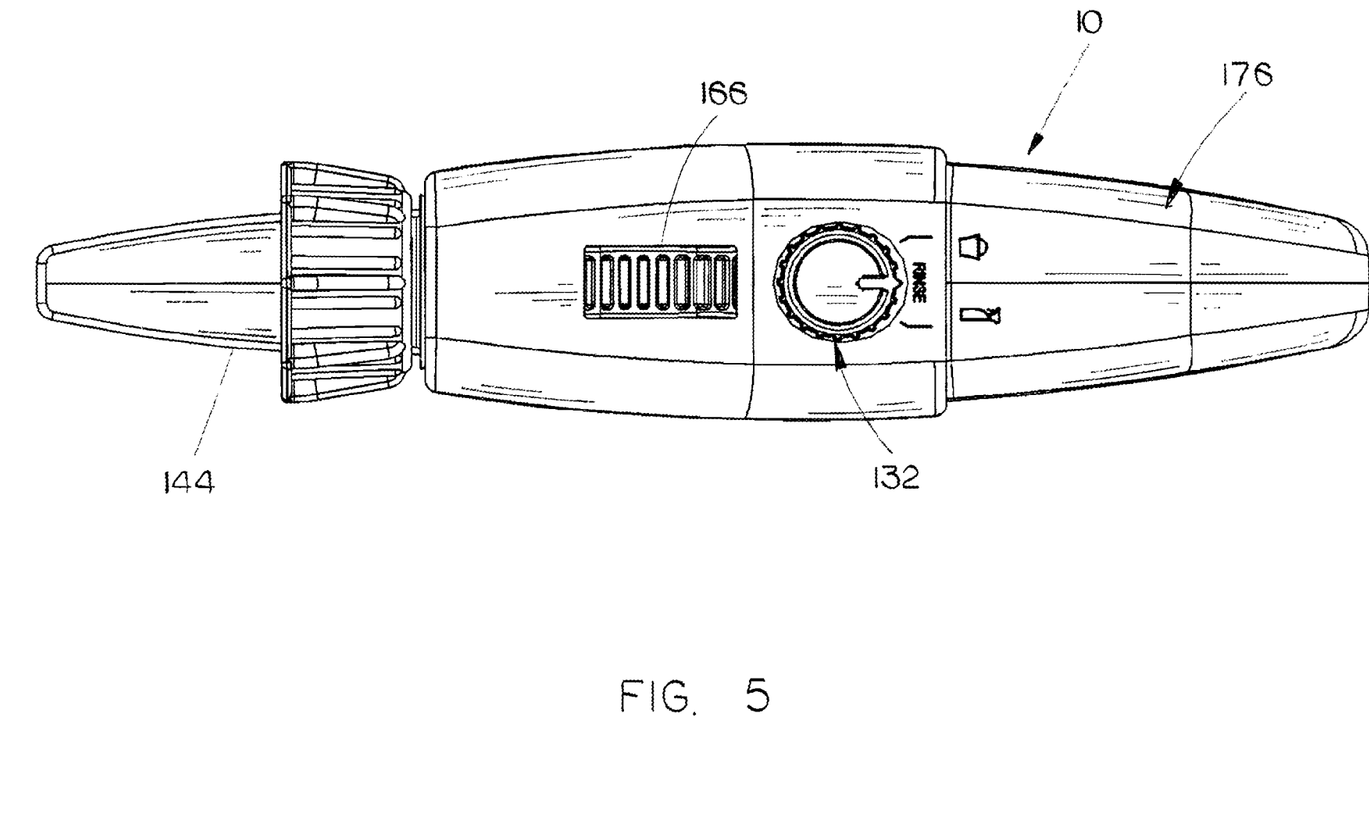
FIG. 5 is a top view of the hand-held dispenser of this invention.
Figure 6:
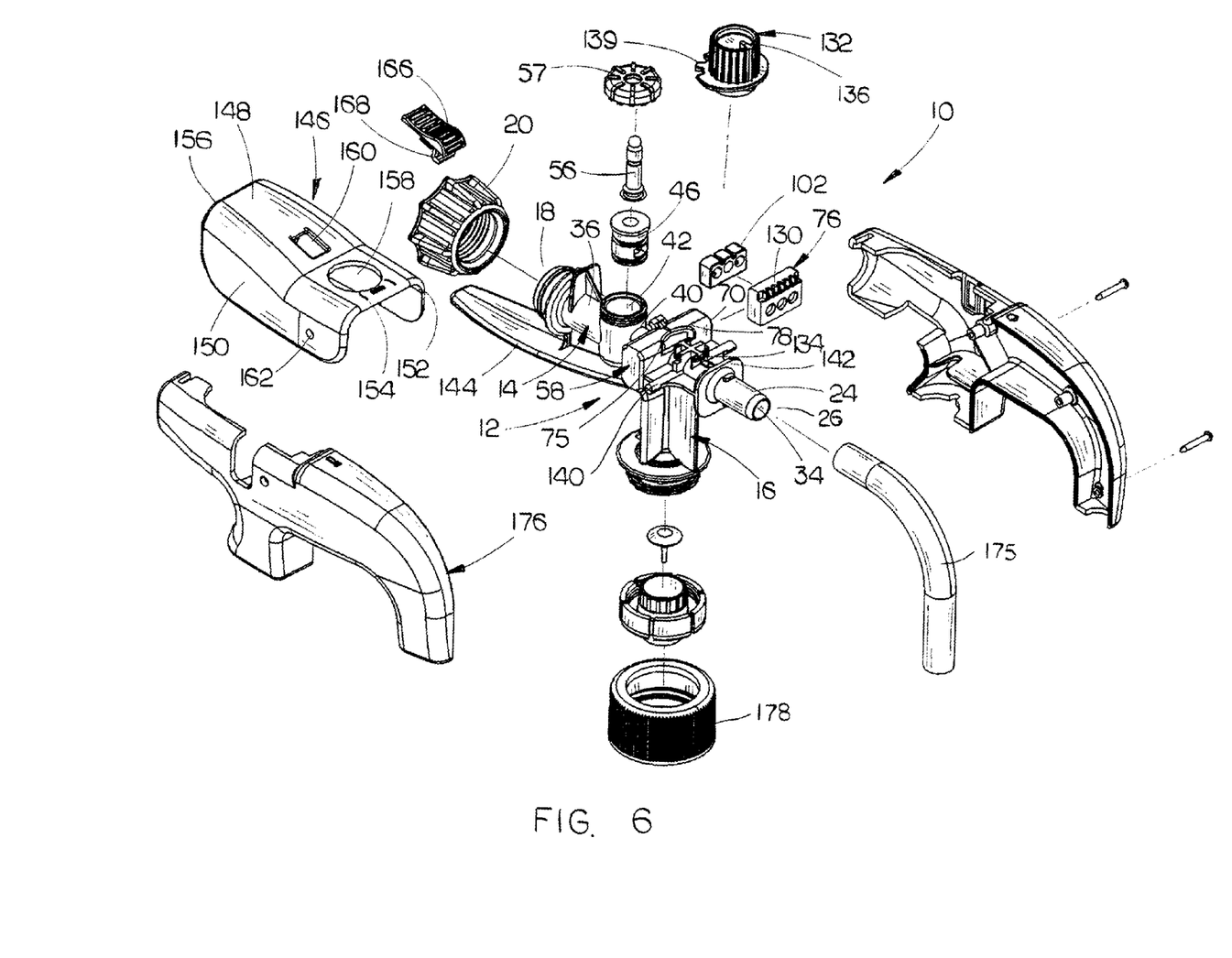
FIG. 6 is an exploded perspective view of the hand-held dispenser of this invention.
Figure 7:
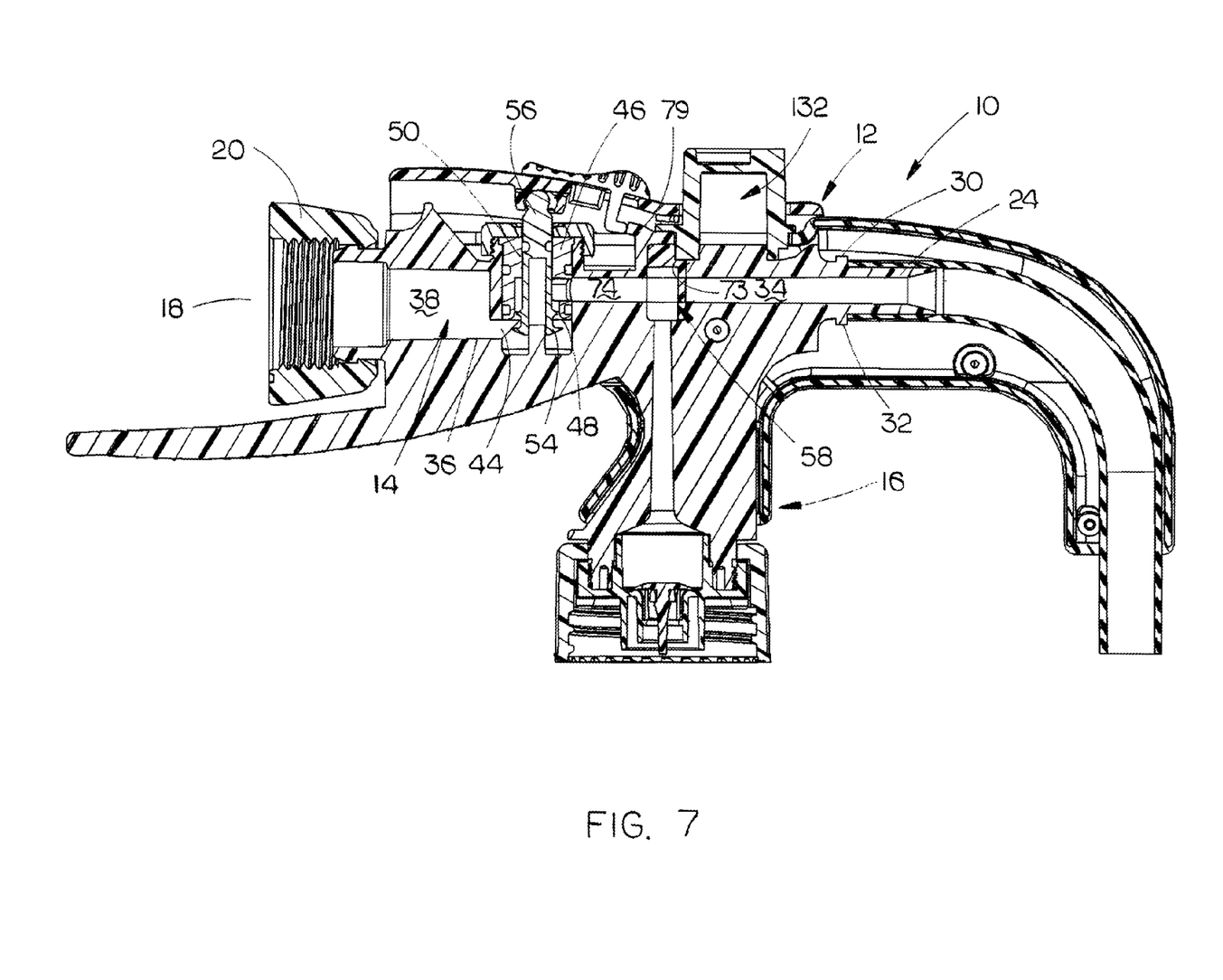
FIG. 7 is a sectional view of the hand-held dispenser of this invention without hatching.
Figure 8:
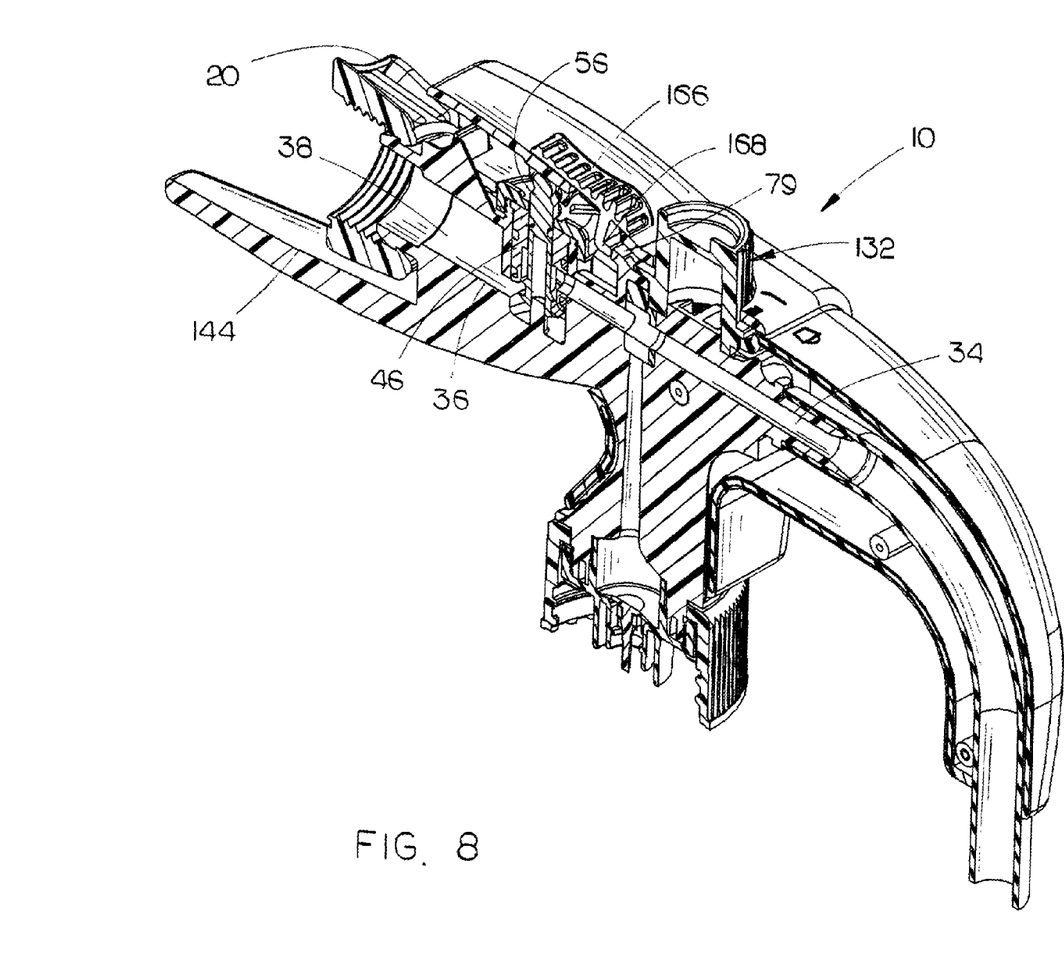
FIG. 8 is a side sectional perspective view of the hand-held dispenser of this invention without hatching.
Figure 9:
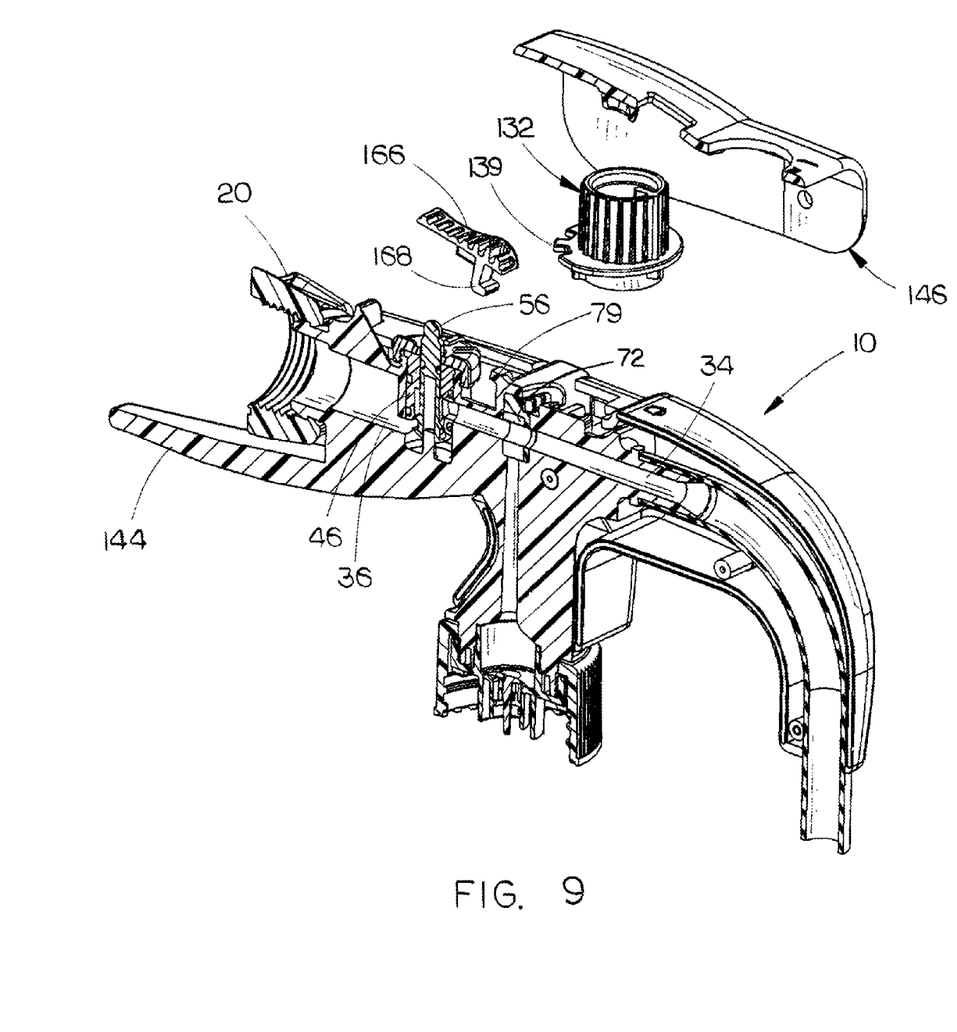
FIG. 9 is a partial sectional view of the hand-held dispenser of this invention.
Figure 10:
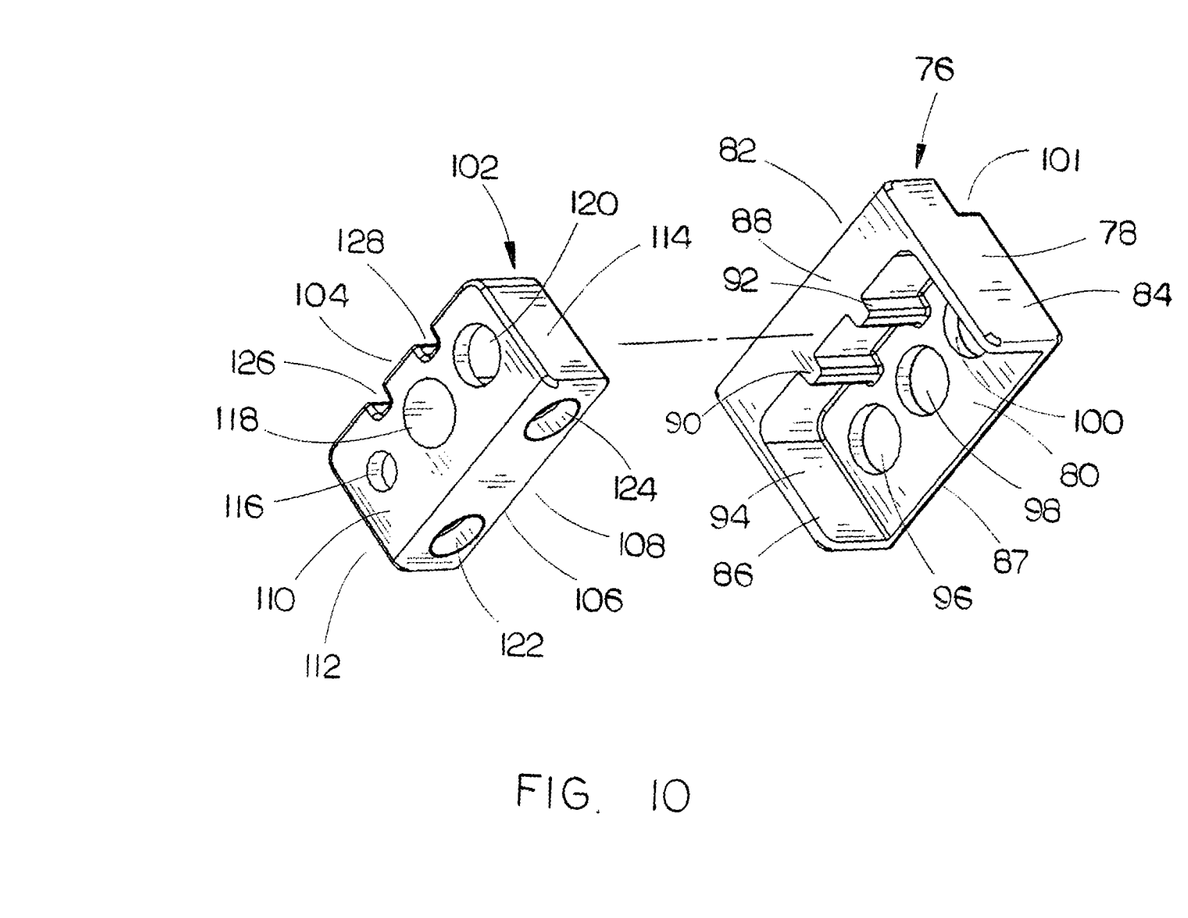
FIG. 10 is an exploded perspective view of the slide valve portion of this invention.
Figure 11:
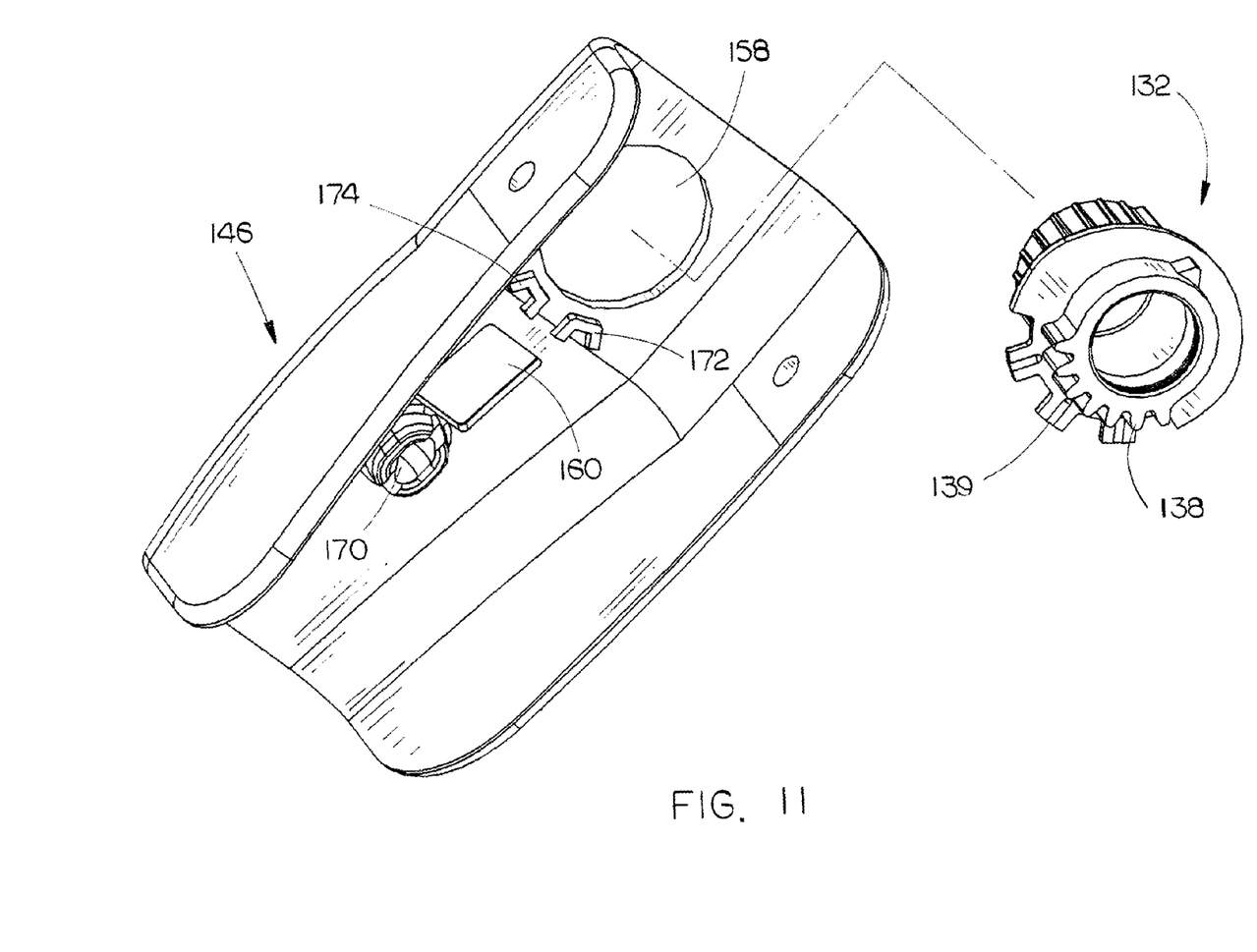
FIG. 11 is a bottom perspective view; of the operating lever and selector knob.
Figure 12:
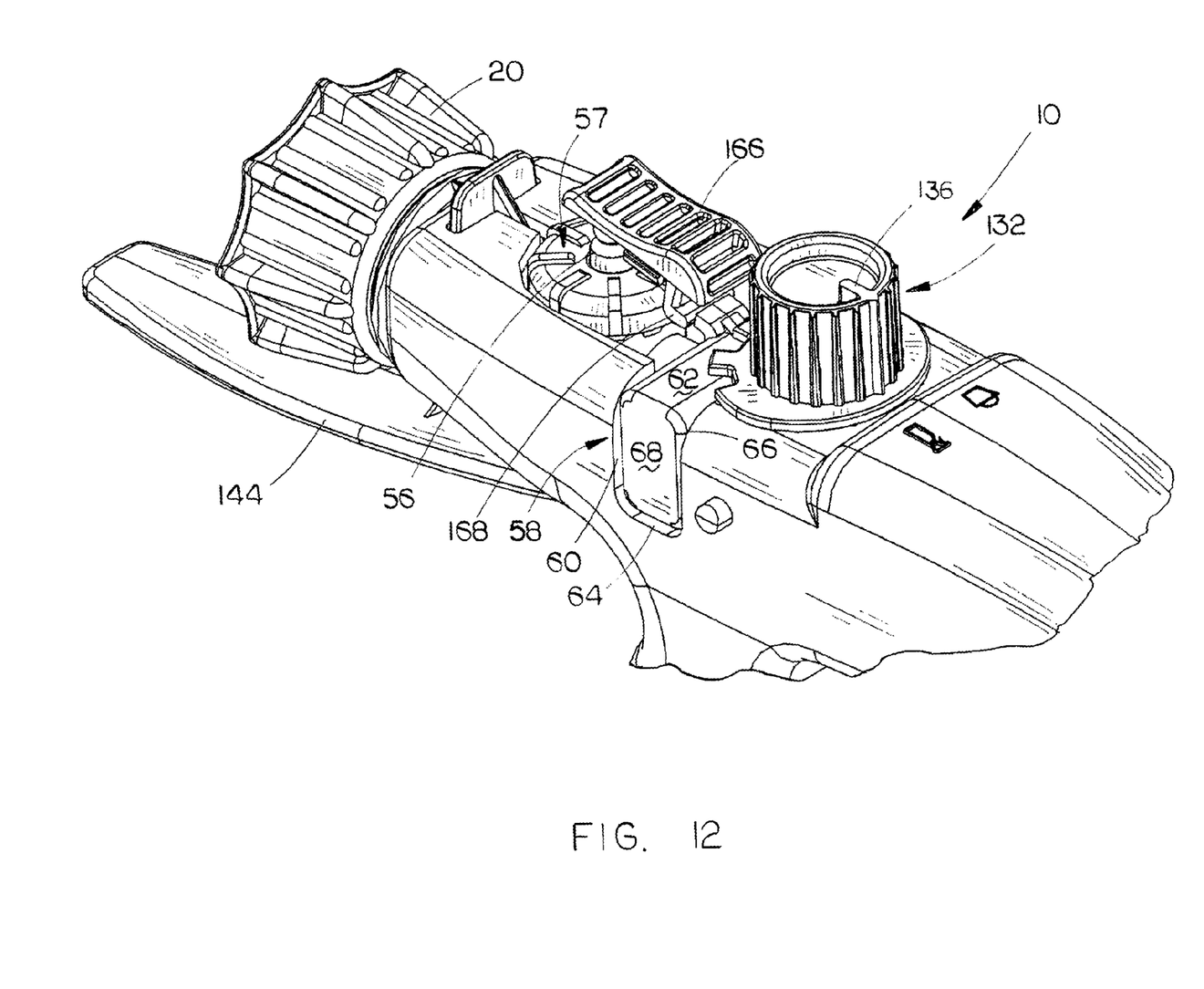
FIG. 12 is a partial top perspective view of the hand-held dispenser of this invention.

Embodiments are described more fully below with reference to the accompanying figures, which form a part hereof and show, by way of illustration, specific exemplary embodiments. These embodiments are disclosed in sufficient detail to enable those skilled in the art to practice the invention. However, embodiments may be implemented in many different forms and should not be construed as being limited to the embodiments set forth herein. The following detailed description is, therefore, not to be taken in a limiting sense in that the scope of the present invention is defined only by the appended claims.

The dispenser of this invention is referred to generally by the reference numeral 10 and includes a dispenser body 12 which is generally T-shaped in configuration and which includes a generally horizontally disposed body portion 14 and a generally vertically disposed body portion 16. Body portion 14 will not always be horizontally disposed when being used nor will body portion 16 always be substantially vertically disposed when in use.

Body portion 14 includes an inlet end 18 which preferably has a rotatable dispenser nut or connector 20 mounted thereon so that a water hose or the like may be secured thereto with the water hose being in communication with a source of water under pressure. It is preferred that a back flow preventer of conventional design be imposed between the water hose and the inlet end 18. An elongated hollow discharge tube 24 is provided at the discharge end 26 of the body portion 14. As will be explained hereinafter, tube 24 may have any type of discharge nozzle selectively removably mounted thereon. A pair of oppositely disposed locking lugs 30 and 32 project from tube 26 adjacent the inner end thereof. Tube 26 has a bore or passageway 34 extending therethrough.

Body portion 14 includes a horizontally disposed cylindrical body member 36 at its inlet end which has a bore or passageway 38 extending therethrough. The inner end of body member 36 joins a vertically disposed hollow cylindrical body member 40 having a vertically disposed cylindrical chamber or passageway 42 formed therein. The inner end of bore 38 of body member 36 communicates with a small opening 44 formed in the side wall of body member 40 so that water may flow through passageway 38, through opening 44 and into chamber 42 above the lower end of body member 40. A generally cylindrical valve guide or insert 46 is selectively removably positioned in chamber 42 above the lower end thereof. Valve guide 46 has an annular valve seat 48 formed therein at the lower end thereof which communicates with bore 50 formed in valve guide 46.

The numeral 54 refers to a valve which is designed to seat upon valve seat 48 to close the same. Valve stem 56 extends upwardly from valve 54 and vertically movably extends upwardly through passageway or bore 50 so that the upper end of valve stem 56 is positioned above valve guide 46. Cap 57 is threadably secured to the upper end of body member 40. As seen, valve stem 56 extends upwardly through cap 57. To this point, the dispenser 10 is generally similar to the dispenser shown in U.S. Pat. No. 8,069,878, the disclosure of which is incorporated herein by reference thereto to complete this disclosure if necessary.

Body portion 14 also includes a transversely extending hollow housing member 58 which is rectangular in configuration. Housing member 58 includes a back wall 60, a top wall 62, bottom wall 64, a front wall 66, a closed end 68 and an open end 70 which define a chamber 72. Back wall 60 has an opening 73 which communicates with a passageway 74 which extends from chamber 42. An opening 75 is formed in the upper end of front wall 66 and the forward end of top wall 62. A lip 79 extends rearwardly from the upper end of back wall 60.

The numeral 76 refers to a slide valve which is horizontally slidably mounted in chamber 72. Slide valve 76 includes a body portion 78 having a front wall 80, top wall 82, end walls 84 and 86, an open lower end 87, and a partial back wall 88, the lower end of which has a pair of guide members 90 and 92 projecting downwardly therefrom into a recessed area 94. Front wall 80 has three openings 96, 98 and 100 formed therein in a spaced-apart manner.

The rectangular block member 102 is frictionally received in recessed area 94 and includes an upper end 104, lower end 106, front end 108, back end 110, and ends 112 and 114. Horizontally disposed bores 116, 118 and 120 are formed in block member 102 and have different sized metering orifices positioned therein. Vertically disposed bores 122 and 124 extend upwardly from lower end 106 of block member 102 and communicate with bores 116 and 120 respectively. The upper front end of block member 102 has a pair of notches 126 and 128 formed therein which receive the guide members 90 and 92 when block member 102 is inserted into recessed area 94 to provide an assembled valve means. The upper front end of slide valve 76 has a plurality of gear teeth 130 formed therein. Slide valve 76 and block member 102 are selectively slidably mounted in chamber 72 of housing 58 so that the gear teeth 130 are exposed in the opening 78 of housing 58.

A selector knob 132 is selectively rotatably mounted on mounting support 134 and which extends upwardly from body portion 14. Knob 132 has a position indicator 136 at its upper end and has a plurality of spaced-apart gear teeth 138 at its lower rearward side which engage the gear teeth 130 of block member 102. Rotation of knob 132 causes valve 76 to be horizontally slidably moved in chamber 72. Knob 132 also has a plurality of spaced-apart teeth 139 which extend rearwardly from knob 132 above the gear teeth 138 for a purpose which will be described in more detail hereinafter. A pair of pivot pins 140 and 142 extend horizontally laterally from body portion 14. A handle 144 extends rearwardly from body portion 14 as seen in the drawings.

The numeral 146 refers to an operating lever which is generally U-shaped in cross-section. Lever 146 includes an upper wall 148, side wall 150, side wall 152, a forward end 154 and a rearward end 156. Upper wall 148 has a circular opening 158 formed therein and a rectangular opening 160 formed therein.

Side walls 150 and 152 have openings 162 and 164 formed therein respectively which receive the pivot pins 140 and 142 therein respectively. Circular opening 156 receives the selector knob 132 and rectangular opening 160 movably receives an on/off thumb switch 166. Thumb switch 166 includes a downwardly and forwardly extending locking lever 168 which is adapted to engage the lip 79 to prevent the lever from being depressed. The underside of upper wall 148 includes a pocket 170 formed therein which is adapted to receive the upper end of the valve stem 56. The underside of upper wall 148 also has a pair of projections 172 and 174 extending downwardly therefrom which are spaced-apart as seen in the drawings. A dispensing tube 175 is secured to the discharge tube 42 in conventional fashion. A two-piece shroud or cover 176 is snap-fitted onto the dispenser body 14, as seen in the drawings.

In use, the connector 20 is threadably secured to a water hose or the like with the water hose being in fluid communication with a source of water under pressure. The cap 178, which is secured to the lower end of body portion 16, is screwed onto the throat of a liquid container so that liquid chemical may be drawn upwardly into the dispenser in the manner described in U.S. Pat. No. 8,069,878, the disclosure of which is incorporated herein by reference thereto to complete this disclosure if necessary.

With the operating lever 146 in its upper "off" position, the operator will rotate the selective knob 132 to either a first position, an intermediate position, or a third position. The rotation of knob 132 causes the slide valve 76 to be slidably moved to a first position, an intermediate position or a third position within housing 58 due to the engagement of the teeth 138 on knob 132 with the teeth 101. In the first position, the lower end of bore 122 will be in communication with the liquid in the container with the upper end of bore being in communication with bore 116 which is in communication with opening 96 in body portion 78 of slide valve 76 with opening 96 being in communication with the water supply once the valve 56 has been opened. In the first position, the slide valve 76 will deliver a predetermined water/chemical ratio or percentage (flow rate) to the container which is being filled from the dispensing tube 175 due to the metering orifices in the bores of the slide valve 76.

In the intermediate position, neither of the bores 122 or 124 will be in communication with the liquid chemical in the container. In the intermediate position, only rinse water is discharged from the dispensing tube once the valve 56 has been opened.

In the third position, the bore 124 will be in communication with the liquid within the container. The bore 120 will be in communication with the water supply to deliver a different water/chemical ratio or percentage (flow rate) to the container which is being filled from the dispensing tube 175 due to the different metering orifices in the bores of the slide valve 76.

The water/chemical mixture or the water flow will begin when the operating lever is depressed to its lower "on" position to open the valve 56. When the operating lever is depressed, the projections 172 and 174 at the underside of the operating lever will be received between the teeth 139 on knob 132 which prevents the knob 132 from rotating during the time when the operating lever is in its "on" position.

Thus it can be seen that the invention accomplishes at least all of its stated objectives.

Although the invention has been described in language that is specific to certain structures and methodological steps, it is to be understood that the invention defined in the appended claims is not necessarily limited to the specific structures and/or steps described. Rather, the specific aspects and steps are described as forms of implementing the claimed invention. Since many embodiments of the invention can be practiced without departing from the spirit and scope of the invention, the invention resides in the claims hereinafter appended.

The invention claimed is:

1. A hand-held dispenser apparatus for controlling the flow rate of water therethrough and for injecting liquid chemical into the water passing through the apparatus, comprising:

a body member;

said body member including a generally horizontally disposed first body portion having first and second sides, an inlet end, and a discharge end;

said body member also including a generally vertically disposed second body portion extending downwardly from said first body portion;

said second body portion having a lower end adapted to be secured to a liquid container;

said first body portion having a generally horizontally disposed first body member which extends inwardly from said inlet end of said body member toward said discharge end thereof;

said first body member having an inlet end and a discharge end;

said first body member having a horizontally disposed first passageway formed therein which extends from said inlet end towards said discharge end thereof;

said first passageway having an inlet end and a discharge end;

said inlet end of said first fluid passageway adapted to be placed in communication with a source of water under pressure;

said first body portion having a generally vertically disposed second body member positioned at said discharge end of said first body member with said second body member having upper and lower ends;

said second body member having a cylindrical chamber formed therein which has an inlet end and a discharge end;

said second body member having a horizontally disposed annular valve seat molded therein above its said inlet end;

said valve seat having a lower inlet side and an upper discharge side;

said lower inlet side of said valve seat being in communication with said first passageway;

said upper discharge side of said valve seat being in communication with said chamber;

a vertically movable first valve means selectively vertically movably mounted in said chamber;

said first valve means including a valve member and a valve stem secured to said valve member which extends upwardly therefrom through said valve seat and said chamber;

said first valve means being vertically movable between a lower position to an upper position;

said valve member of said first valve means closing said valve seat when said first valve means is in its said upper position;

said valve member, when said first valve means is in its said lower position, permitting the flow of water from said first passageway, through said valve seat, and upwardly into said chamber;

a valve actuating lever pivotally secured to said first body portion which is operatively connected to the upper end of said valve stem;

said lever being pivotally movable from an upper "off" position wherein said first valve means is in its said upper position to a lower "on" position wherein said valve member is unseated from said valve seat;

said discharge end of said first passageway being positioned below said lower inlet end of said valve seat so that the water under pressure in said first passageway exerts pressure against the lower end of said valve member of said first valve means when said first valve means is in said upper position to assist in maintaining said first valve means in its said upper position;

said first body portion having a horizontally disposed second passageway formed therein which extends from said chamber, above said valve seat, towards said discharge end of said first body portion;

said first body portion having a transversely extending rectangular housing positioned at the downstream side of said second body member;

said rectangular housing including a bottom wall, a top wall, a back wall, a front wall, a closed first end and an open second end;

said bottom wall of said housing having a liquid chemical inlet opening formed therein which is in fluid communication with the liquid container;

said back wall of said housing having a water inlet opening formed therein which is in communication with said second passageway of said first body portion;

said front wall of said housing having a discharge opening formed therein;

a rectangular slide valve slidably mounted in said rectangular housing between a first position, an intermediate position, and a second position;

said slide valve having a lower end, an upper end, a back side, a front side, a first end and a second end;

a first liquid chemical passageway, having upper and lower ends, extending vertically upwardly from said lower end of said slide valve partially through said slide valve;

a second liquid chemical passageway, having upper and lower ends, extending vertically upwardly from said lower end of said slide valve partially through said slide valve;

a first water passageway, having a back end and a front end, extending horizontally through said slide valve;

said first liquid chemical passageway being in fluid communication with said first water passageway;

a second water passageway, having a back end and a front end, extending horizontally through said slide valve in a spaced relationship to said first water passageway;

said second liquid chemical passageway being in fluid communication with said second water passageway;

an intermediate water passageway, having a back end and a front end, extending horizontally through said slide valve between said first and second water passageways;

said slide valve being selectively horizontally slidably movable between first, intermediate and second positions relative to said housing;

said back end of said first water passageway of said valve slide being in fluid communication with said water inlet opening in said back wall of said housing when said slide valve is in said first position;

said back end of said second water passageway of said slide valve being in fluid communication with said water inlet opening in said back wall of said housing when said slide valve is in said second position;

said back end of said intermediate water passageway of said slide valve being in fluid communication with said water inlet opening in said back wall of said housing when said slide valve is in said intermediate position;

said front end of said first water passageway of said slide valve being in fluid communication with said discharge opening in said front wall of said housing when said slide valve is in said first position;

said front end of said second water passageway of said slide valve being in fluid communication with said discharge opening in said front wall of said housing when said slide valve is in said second position;

said front end of said intermediate water passageway of said slide valve being in fluid communication with said discharge opening in said front wall of said housing when said slide valve is in said intermediate position;

a rotatable selector knob rotatably mounted on said body member about a vertical axis;

said selector knob being rotatable between first, intermediate and second positions;

said selector knob being operatively connected to said slide valve to selectively move said slide valve between said first, intermediate and second positions;

said slide valve having gear teeth formed therein;

said selector knob having gear teeth formed thereon which are in meshing engagement with said gear teeth on said slide valve;

said discharge opening of said housing being in fluid communication with said discharge end of said body member.

2. The hand-held dispenser of claim 1 wherein said housing has an opening formed therein which exposes said gear teeth on said slide valve, said gear teeth on said selector knob extending through said opening in said housing to mesh with said gear teeth on said slide valve.

3. The hand-held dispenser of claim 1 wherein said first and second chemical passageways in said slide valve have metering orifices positioned therein.

4. The hand-held dispenser of claim 1 wherein said first and second water passageways in said slide valve have metering orifices positioned therein.

5. The hand-held dispenser of claim 1 wherein said slide valve is selectively removable from said housing so that alternate slide valves may be selectively positioned in said housing.

6. The hand-held dispenser of claim 1 wherein said slide valve includes a selectively removable insert therein with said first and second chemical passageways and said first, second and intermediate water passageways being formed in said removable insert.

* * * * *